June 27, 1972     E. A. KOIVUNEN     3,672,731

FAIL SAFE BRAKE ANTILOCK MODULATOR

Filed Dec. 18, 1970     2 Sheets-Sheet 1

INVENTOR.
Erkki A. Koivunen
BY
D. D. McGraw
ATTORNEY

United States Patent Office 3,672,731
Patented June 27, 1972

3,672,731
FAIL SAFE BRAKE ANTILOCK MODULATOR
Erkki A. Koivunen, Livonia, Mich., assignor to General Motors Corporation, Detroit, Mich.
Filed Dec. 18, 1970, Ser. No. 99,579
Int. Cl. B60t *8/06*
U.S. Cl. 303—21 F     3 Claims

ABSTRACT OF THE DISCLOSURE

A brake pressure modulator for a vehicle brake antilock system includes a modulator valve which is located fluidly intermediate the brake pressure source and the controlled wheel brake and which is normally held unseated by a piston which forms a wall of the fluid passage communicating with the wheel brake. The piston is normally supported by fluid pressure and this fluid pressure is exhausted upon impending wheel lock, allowing the piston to withdraw, seating the modulator valve to isolate the brake from the brake pressure source and withdrawing brake fluid from the wheel brake to permit wheel acceleration. The invention provides a passage which bypasses the modulator valve, and a normally closed bypass valve in the bypass passage which is responsive to a substantially complete loss of modulator piston supporting pressure to open brake fluid communiction between the brake pressure source and the wheel brakes through the bypass passage.

---

Figure 1:
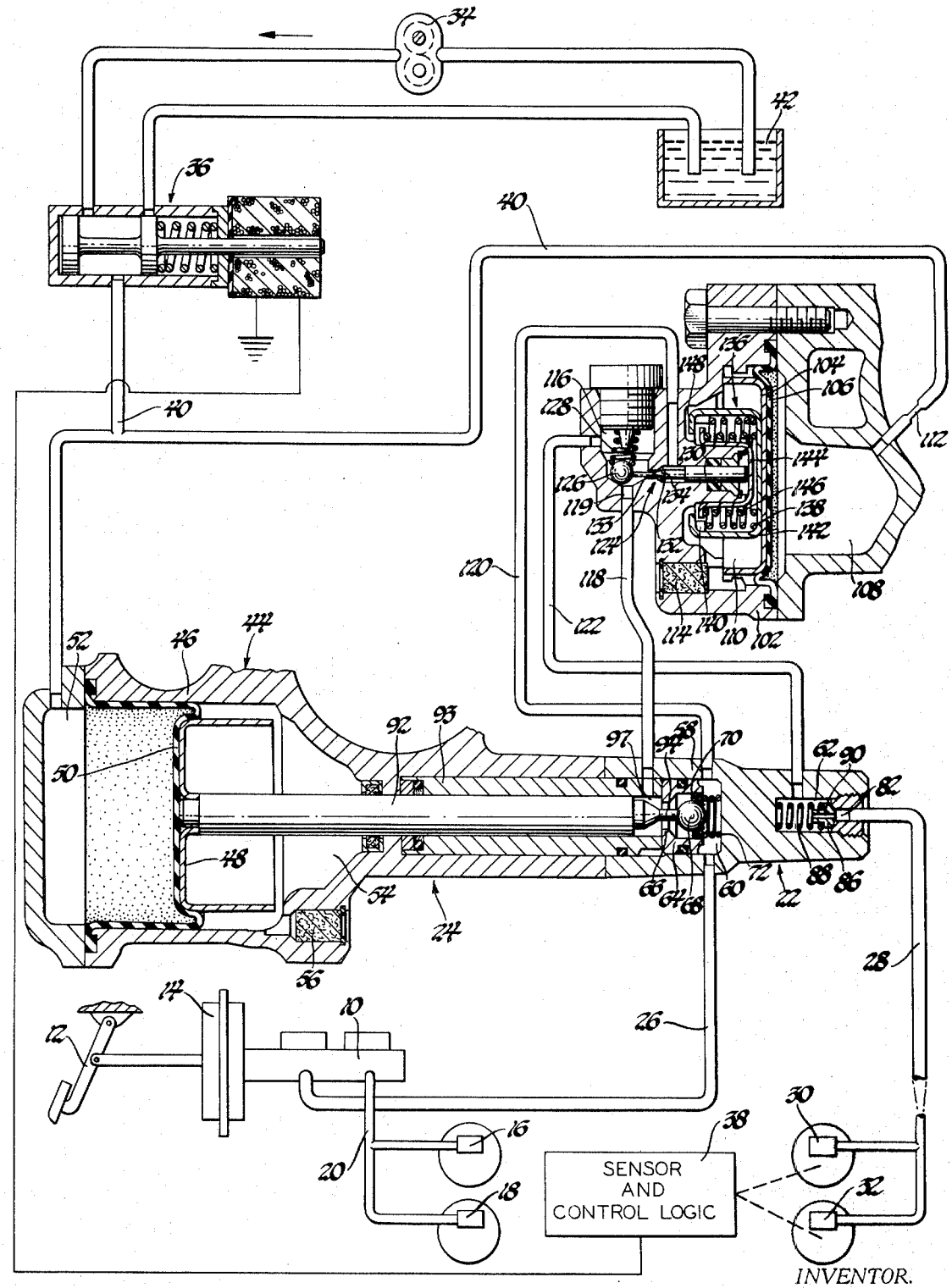

The invention relates to a brake pressure modulator and more particularly to a brake pressure modulator provided with an automatic bypass valve arrangement which prevents a loss of brake control by the operator due to operating fluid pressure loss in the antilock system.

It is desirable in a fluid pressure supported brake pressure modulator to provide a bypass arrangement which will in the event of a pressure loss insure the return brake control to the vehicle driver. Such a brake pressure modulator includes generally a modulator valve which is located fluidly intermediate the brake pressure source and the controlled wheel brakes and which is normally held unseated by a fluid pressure supported piston which forms a wall of the fluid passage communicating with the wheel brake. The piston normally holds the check valve unseated but upon impending wheel lock is withdrawn, sequentially seating the modulator valve whereby fluid communication is blocked between the master cylinder and the wheel brake, and withdrawing brake fluid from the wheel brake whereby the wheel is permitted to accelerate. When the impending wheel lock condition is arrested, the piston is forcibly moved to reapply pressure to the wheel brakes and unseat the modulator valve reestablishing brake fluid communication between the master cylinder and the wheel brakes. In this manner, the antilock control system overrides the vehicle driver's control of the brake system and limits the level of braking effort in response to the sensed wheel slip condition.

The present invention is adapted for use in a modulator of the type having a modulator piston supported by fluid pressure and provides a bypass arrangement which senses a loss of modulator piston supporting pressure and opens fluid communication through a fluid passage bypassing the modulator valve. Briefly stated, the invention provides a bypass passage and a normally closed bypass valve in the bypass passage which is responsive to a substantially complete loss of modulator piston supporting pressure to open brake fluid communication between the brake pressure source and the wheel brakes through the bypass passage.

Figure 2:
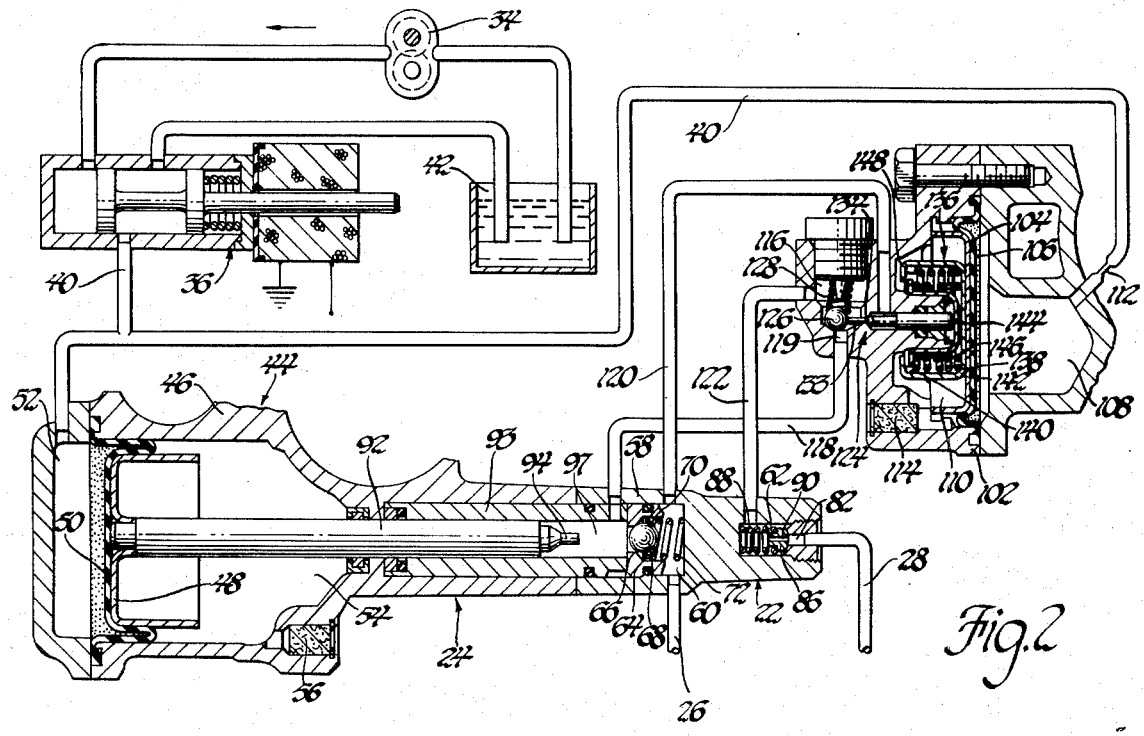
Figure 3:
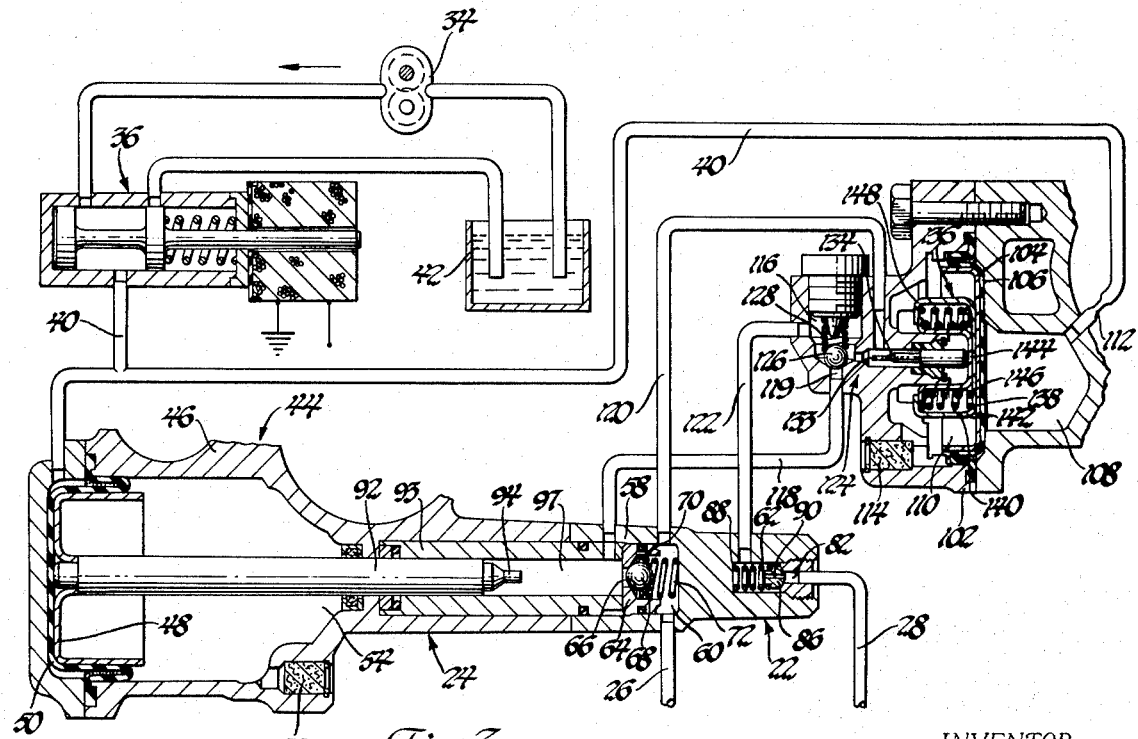

In the drawings:

FIG. 1 includes a schematic illustration of a vehicle wheel brake antilock system including a modulator embodying the invention, having parts broken away and in section, and shown in the brake released or normal braking position;

FIG. 2 is a schematic illustration of the vehicle wheel brake antilock system of FIG. 1 showing the fail-safe modulator in the brake release mode of antilock operation; and FIG. 3 is a schematic illustration of the vehicle wheel brake antilock system of FIG. 1 showing the operation of the fail-safe feature of the modulator upon loss of modulator operating pressure.

Referring to FIG. 1, the vehicle wheel antilock system includes a master cylinder 10 which is operated by a brake pedal 12 and a brake booster 14. The master cylinder 10 is illustrated as being of the dual pressure chamber type with the front chamber connected to the front wheel brakes 16 and 18 by a conduit 20. The rear chamber of the master cylinder 10 is connected to the valve section 22 of the modulator assembly 24 by conduit 26. Conduit 28 connects the valve section 22 with the rear wheel brakes 30 and 32. A fluid pump 34, which may be a power steering pump, transmission pump, or similar pressure source and which includes an appropriate pressure relief valve, provides a source of modulator operating fluid. A solenoid valve 36 is operable by a wheel condition sensor and control logic unit 38 to selectively channel operating fluid from the pump 34 to the conduit 40 or from conduit 40 to the operating fluid reservoir 42. A suitable example of a wheel condition sensor and control logic is disclosed in U.S. Pat. 3,524,685, by Harned et al.

The piston section 44 of the modulator 24 includes a housing 46 in which piston 48 and diaphragm 50 are located. Piston 48 and diaphragm 50 cooperate to form a movable wall which divides the piston section 44 into an expansible pressure chamber 52 and an atmospheric pressure chamber 54. Vent assembly 56 communicates atmospheric pressure to the atmospheric chamber 54. Conduit 40 connects the expansible pressure chamber 52 and the solenoid valve 36 and normally communicates fluid from the pump 34 to the expansible pressure chamber 52 so that the piston 36 is urged in a direction tending to increase the volume of expansible pressure chamber 52.

Valve section 22 of the modulator assembly 24 includes a housing 58 in which a chamber 60 and a chamber 62 are formed. An insert 64 is situated in chamber 60 and provides an annular valve seat 66. A modulator valve 68, illustrated as being a ball type valve, is located in the chamber 60. A retainer 70 engages the modulator valve 68 forming a seat for spring 72. The other end of spring 72 is seated at the housing 58 and urges modulator valve 68 to a seated position on the valve seat 66 thus forming a check valve. Conduit 28 which communicates with the rear wheel brakes 30 and 32 is connected to the chamber 62 at port 82. Check valve 86 is located in chamber 62 and is urged by a spring 88 to block port 82. Check valve 86 includes an orifice 90. Piston rod 92 is sealingly slidable in sleeve 93 of housing 46 and has one end attached to piston 48. The other end of piston rod 92 is necked down to form a pin 94 which extends unsealingly through the annular valve seat 66 to operatively engage modulator valve 68. The necked down portion of piston rod 92 cooperates with housing 58 and insert 64 to form a chamber 97. The volume of chamber 97 varies with the position of piston rod 92. FIG. 1 shows piston rod 92 in its normal position wherein the pump generated operating fluid pressure in expansible chamber 52 acting on piston 48 forces pin 94 of piston rod 92 into unseating engagement of modulator valve 68.

Assume for the present that, as will be hereinafter described, a conduit is provided connecting the chamber 97 with chamber 62. Fluid communication is thereby established from the master cylinder 10 through conduit 26, chamber 60, valve seat 66, chamber 97, chamber 62, orifice 90, and conduit 28 to the rear wheel brakes 30 and 32. During braking, the operating fluid pressure in expansible pressure chamber 52 holds piston rod 92 in its position of FIG. 1 against the opposing force of the brake fluid pressure acting on the end of the piston rod 92. When during braking an impending wheel lock condition is encountered, the wheel condition sensor and control logic 38 shifts solenoid valve 36 to block fluid communication from pump 34 to conduit 40 and open fluid communication from conduit 40 to the reservoir 42. Fluid pressure in expansible pressure chamber 52 is consequently exhausted allowing the brake pressure acting on the end of piston 92 to move the piston rod 92 leftwardly. Modulator valve 68 is consequently seated by spring 72 isolating the wheel brakes 30 and 32 from the master cylinder 10. Further movement of piston 92 by the brake fluid pressure increases the volume of chamber 97, withdrawing brake fluid from the wheel brakes 30 and 32 and allowing the wheels associated therewith to accelerate. FIG. 2 shows the system in the brake release mode of antilock operation.

When the impending wheel lock condition has been arrested, the wheel condition sensor and control logic 38 shifts solenoid valve 36 to reestablish fluid communication from pump 34 to expansible pressure chamber 52. Piston 48 and piston rod 92 are forcibly moved rightwardly to return braking fluid to the wheel brakes 30 and 32 and unseat the modulator valve 68 so that fluid communication is reestablished between master cylinder 10 and wheel brakes 30 and 32. The aforedescribed cycle of brake release and brake apply occurs in a fraction of a second and the pressure in expensible pressure chamber 52 does not normally even approach zero.

If there is a loss of operating fluid pressure in expansible pressure chamber 52 when the master cylinder 10 is not actuated, and hence there is no brake fluid pressure in chambers 60 and 97, spring 72 moves modulator valve 68 and piston rod 92 leftwardly until modulator valve 68 is seated. Upon subsequent actuation of the master cylinder 10, the brakes 30 and 32 will not be applied since the modulator valve 68 blocks brake fluid communication to the wheel brakes. If there is a loss of modulator operating pressure in expansible pressure chamber 52 when the master cylinder 10 is actuated, the brake fluid pressure in chambers 60 and 97 will move piston rod 92 leftwardly, seating modulator valve 68 to isolate the master cylinder from the wheel brakes, and the brake pressure in the wheel brakes will act on the piston rod 92 moving it further leftwardly causing a release of the wheel brakes. Similarly, if an operating fluid pressure loss occurs subsequent to the brake release mode of antilock operation, the piston rod 92 will not be forcibly moved rightwardly to reapply the brake pressure and open modulator valves 68. In each of these instances the vehicle operator's control over the brake system is preempted. It is therefore desirable to provide a bypass arrangement which will provide fluid communication between the master cylinder 10 and the wheel brakes 30 and 32.

Referring again to FIG. 1, such a bypass valve arrangement is provided in housing 102. Piston 104 and diaphragm 106 cooperate to form a movable wall which divides housing 102 into an expansible pressure chamber 108 and an atmospheric chamber 110. Conduit 40 is connected to expansible pressure chamber 108 and communicates pump pressure thereto which forces piston 104 to a normal rest position engaging housing 102. An orifice 112 in conduit 40 controls the rate of pressure change in expansible pressure chamber 108. Atmospheric chamber 110 is vented to the atmosphere through filter 114. A valve chamber 116 in the housing 102 communicates with chamber 97 through conduit 118 and with chamber 62 through conduit 122 to provide the normal fluid connection between master cylinder 10 and wheel brake 30 and 32 which was hereinbefore referred to. A conduit 120 connects chambers 60 and 116 to provide a passage which connects master cylinder 10 and brakes 30 and 32 by bypassing modulator valve 68. It is noted that it may be advantageous to provide a single housing in place of housings 58 and 102 wherein the conduits 118, 120 and 122 could be provided as fluid passages in the integral housing.

A bypass valve, indicated generally at 124, normally allows communication of braking fluid from chamber 60 to chamber 62 through annular valve seat 66 and conduits 118 and 122 while blocking conduit 120. Upon malfunction of the modulator the valve 124 establishes fluid communication between chambers 60 and 62 through conduits 120 and 122 and blocks conduit 118. The bypass valve 124 includes a ball valve 126 which is urged by spring 128 into seating engagement of port 119 to block fluid flow from chamber 116 into conduit 118. A piston rod 130 is sealingly slidable in housing 102 and forms a movable wall of conduit 120. Housing 102 forms an annular valve seat 132 at the juncture of conduit 120 and valve chamber 116. The end 133 of piston rod 130 extends unsealingly through the annular valve seat 132 and is unseatably engageable with ball valve 126. A conical portion 134 of piston rod 130 is seatable at valve seat 132. FIG. 1 shows piston rod 130 in its position corresponding to proper functioning of the modulator wherein ball valve 126 is held unseated and valve seat 132 is blocked. Piston rod 130 is held in its position of FIG. 1 by a spring assembly, indicated generally at 136. The spring assembly 136 includes a spring 138 which is seated at abutment 140 of housing 102 and urges outer member 142 into abutting engagement of piston 104. The piston rod 130 abuttingly engages inner member 144. Spring 146 engages inner member 144 and is seated at outer member 142 thereby providing the sole force transmitting connection between the piston 104 and the piston rod 130.

In operation, when there is a pressure decrease in expansible pressure chamber 52 to substantially zero, allowing the modulator piston 48 and piston rod 92 to withdraw seating modulator valve 68, the operating pressure is also decreased in expansible pressure chamber 108 and fluid is displaced therefrom at a controlled rate through orifice 112. The effect of orifice 112 is to isolate expansible pressure chamber 108 from spurious pressure variations incident to operation of the antilock cycle and to sufficiently delay the response of chamber 108 pressure to a pressure change in chamber 52 to assure that the bypass valve 136 can distinguish between an unscheduled pressure loss and a pressure decrease incident to normal cycling of the piston rod 92. When the pressure in expansible pressure chamber 108 becomes substantially zero, for example 5 p.s.i., spring 138 urges outer member 142 and the abutting piston 104 to move rightwardly to the position shown in FIG. 3. As outer member 142 moves rightwardly, spring 146 extends in length holding inner member 144 in engagement with piston rod 130 until the circumferentially spaced tangs 148 of outer member 142 engage inner member 144, thereby limiting the expansion of spring 146. During further rightward movement of piston 104, the spring 138 causes unitary rightward movement of outer member 142 and inner member 144. If master cylinder 10 is actuated at this time, the brake fluid pressure in conduit 120 acts on piston rod 130 and moves piston rod 130 rightwardly. If the master cylinder 10 is not actuated when the pressure is lost in expansible pressure chamber 108, the piston 130 remains poised for rightward movement upon subsequent master cylinder actuation. Rightward movement of piston 130 sequentially unseats conical portion 134 from valve seat 132 opening fluid communication between conduit 120 and 122, and withdraws the end 133 of piston rod 130 from engagement of ball valve 126 allowing it to be seated by spring 128, thereby blocking port 119 and conduit 118 connected thereto. Brake fluid pressure is thereby communicated from master cylinder 10 through conduit 26, chamber 62, conduit 120, annular valve seat 132, valve chamber 116, conduit 122, chamber 62, orifice 90, and conduit 28 to the rear wheel brakes 30 and 32. The seating of ball valve 126 at port 119 blocks communication of brake pressure to chamber 97 so that an additional volume of brake fluid is not consumed in moving piston rod 92 further leftwardly if not already moved fully leftwardly.

Subsequent re-establishment of operating fluid pressure to expansible pressure chamber 52 moves piston 48 and piston rod 92 rightwardly to unseat modulator valve 68 and increases the pressure in expansible pressure chamber 108 moving piston 104, spring assembly 136 and piston rod 130 leftwardly to unseat ball valve 126 and seat conical portion 134 at annular valve seat 132.

Thus, a brake antilock modulator is provided which will open an alternate passage between the master cylinder and the wheel brake upon loss of modulator operating pressure.

What is claimed is:

1. A motor vehicle brake antilock system comprising:
   an intermittently operable source of braking pressure;
   fluid pressure operated wheel brakes;
   first conduit means fluidly connecting the brake pressure source and the wheel brakes;
   a housing interposed in the first conduit means between the brake pressure source and at least one of the wheel brakes, the housing including first and second parallel passages connecting the brake pressure source and the at least one wheel brake;
   modulator valve means in the first passage permitting fluid flow through the first passage from the wheel brake to the brake pressure source;
   bypass valve means in the housing selectively blocking and permitting fluid communication through the second passage;
   first pressure responsive means in the housing having one end forming therewith an expansible chamber and passage, the first pressure responsive means extending unsealingly through the first passage and being unseatingly engageable with the modulator valve means;
   means providing a source of operating fluid pressure;
   second conduit means communicating operating fluid pressure to the first expansible chamber whereby the first pressure responsive means unseatingly engages the modulator valve means;
   control valve means in the second conduit means acting the other end forming a movable wall of the first upon impending wheel lock to exhaust fluid from the first expansible chamber whereby the braking pressure in the first passage moves the first pressure responsive means to seat the modulator valve means and increase the volume of the first passage to at least partially release the at least one wheel brake;
   a second pressure responsive means in the housing forming therewith a second expansible chamber and operatively connected to the bypass valve means;
   and third conduit means in direct fluid connection between the first and second expansible chambers whereby fluid pressure acting on the second pressure responsive means operates the bypass valve to block the second passage and when the fluid pressure in the first and the second expansible chambers is reduced to a predetermined magnitude the second pressure responsive means effects operation of the bypass valve means to open fluid communication through the second passage.

2. A motor vehicle brake antilock system comprising:
   an intermittently operable source of braking pressure;
   fluid pressure operated wheel brakes;
   first conduit means fluidly connecting the brake pressure source and the wheel brakes;
   a housing interposed in the first conduit means between the brake pressure source and at least one of the wheel brakes and providing first and second parallel fluid passages therebetween;
   a check valve in the first passage permitting fluid flow from the wheel brake to the brake pressure source;
   a modulator piston sealingly movable in the housing, one end forming therewith a first expansible chamber and the other end forming a movable wall of the first passage, extending unsealingly through the first passage, and being engageable with the check valve;
   valve means in the housing selectively permitting fluid communication through only the first passage or the second passage and being urged by braking pressure to block fluid communication through the first passage and open fluid communication through the second passage;
   second piston means movable in the housing and forming therewith a second expansible chamber, the second piston means operatively engaging the valve means;
   pump means providing a source of fluid flow and pressure;
   second conduit means connecting the pump means with the first expansible chamber and the second expansible chamber;
   orifice means in the second conduit restricting fluid communication with the second expansible chamber;
   control valve means in the second conduit fluidly intermediate the pump means and the first and second expansible chambers and normally communicating fluid pressure from the pump means to the first and second expansible chamber whereby the modulator piston is held in unseating engagement of the check valve and the second piston holds the valve means against the braking pressure acting thereon whereby fluid communication is permitted through the first passage;
   the control valve acting upon impending wheel lock to exhaust fluid from the first and second expansible chambers whereby the brake fluid pressure causes the first piston to move, sequentially seating the check valve and increasing the volume of the first passage to release the at least one wheel brake;
   and whereby when the fluid pressure in the second expansible chamber approaches zero, the brake pressure in the second passage acting on the valve means moves the valve means to block fluid communication through the first passage and open fluid communication through the second passage.

3. In a motor vehicle having fluid pressure operated wheel brakes, an intermittently operable brake pressure source, pump means providing a source of fluid flow and pressure, a control valve operable by wheel condition sensing and control logic means, a fluid pressure operated brake pressure modulator located fluidly intermediate the brake pressure source and at least one of the wheel brakes and comprising:
   means including a housing forming first and second parallel passages fluidly connecting the brake pressure source and the at least one wheel brake;
   a modulator valve means in the first passage and unseatable by differential pressure to permit fluid flow through the first passage in one direction only from the wheel brake to the brake pressure source;
   a modulator piston movable in the housing and forming therewith a first expansible chamber, the piston forming a movable wall of the first passage, extending unsealingly through the first passage, and being unseatingly engageable with the modulator valve means;
   a check valve located in the first passage between the modulator valve and the wheel brake and being unseatable by differential pressure to permit fluid flow through the first passage from the brake pressure source of the wheel brake;
   a second piston movable in the housing and forming therewith a second expansible chamber;

an annular valve seat formed in the housing at the juncture of the first and second passages nearest the wheel brake;

a valve member in the second passage having one end sealingly slidable in the housing and extending into operative engagement with the second piston, the other end being of lesser diameter and extending unsealingly through the annular valve seat and unseatingly engageable with the check valve in the first passage, a central portion forming a conical surface adapted to seat at the annular valve seat blocking fluid communication through the second passage when the check valve is unseatingly engaged and a shoulder being acted upon by the second passage pressure urging the conical portion out of seating engagement with the housing;

conduit means including the control valve normally communicating fluid pressure from the pump means to the first and second expansible chambers whereby the modulator piston is held in one position unseatingly engaging the modulator valve means and the second piston is held in one position unseatingly engaging the check valve and blocking fluid communication through the second passage;

and orifice means in the conduit means limiting the rate of fluid communication with the second expansible chamber;

the control valve means being shifted upon impending wheel lock to exhaust pressure from the first and second expansible chambers whereby the braking pressure acting on the modulator piston moves the modulator piston from the one position sequentially seating the modulator valve and increasing the volume of the first passage to withdraw braking fluid from the at least one wheel brake;

the control valve being normally returned to the normal position before braking pressure in the second passage acting on the valve member overcomes the pressure in the second expansible chamber acting on the second piston whereby the check valve is held unseated and the second passage means blocked during normal operation of the antilock cycle;

and whereby when the pressure in the first and second expansible chambers decrease to substantially zero, the brake pressure in the second passage moves the valve member to seat the check valve and open fluid communication through the second passage, thereby bypassing the seated modulator valve to establish fluid communication between the master cylinder and the at least one wheel brake.

References Cited

UNITED STATES PATENTS

| | | | |
|---|---|---|---|
| 3,550,966 | 12/1970 | Lieber | 303—21 |
| 3,589,775 | 6/1971 | Dawson | 303—21 |

EVON C. BLUNK, Primary Examiner

H. S. LANE, Assistant Examiner

PO-1050
(5/69)

UNITED STATES PATENT OFFICE
CERTIFICATE OF CORRECTION

Patent No. __3,672,731__          Dated __June 27, 1972__

Inventor(s) __Erkki A. Koivunen__

It is certified that error appears in the above-identified patent and that said Letters Patent are hereby corrected as shown below:

In the title, delete "Fail Safe". Column 3, line 34, change "expensible" to --expansible--. Column 5, line 38, insert the following --the other end forming a movable wall of the first--; line 48, delete "the other end forming a movable wall of the first". Column 6, line 72, change "of" to --to--. Column 8, in the references, insert --3,544,171, 12/1970, Lester et al, 303-21--.

Signed and sealed this 13th day of March 1973.

(SEAL)
Attest:

EDWARD M. FLETCHER, JR.         ROBERT GOTTSCHALK
Attesting Officer                  Commissioner of Patents